United States Patent
Kang et al.

(10) Patent No.: US 9,536,273 B2
(45) Date of Patent: Jan. 3, 2017

(54) SIMULATION METHOD FOR IMPROVING PICTURE QUALITY OF IMAGE DISPLAY DEVICE AND A SIMULATION DEVICE THEREFOR

(75) Inventors: Dong-Woo Kang, Gyeonggi-do (KR); Hyun-Ho Shin, Gyeonggi-do (KR); Moo-Jong Lim, Seoul (KR); Jae-Kyeong Yun, Gyeonggi-do (KR); Ho-Young Jung, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 317 days.

(21) Appl. No.: 13/192,642

(22) Filed: Jul. 28, 2011

(65) Prior Publication Data
US 2012/0038656 A1    Feb. 16, 2012

(30) Foreign Application Priority Data
Aug. 11, 2010    (KR) ........................ 10-2010-0077537

(51) Int. Cl.
*G06T 1/00*    (2006.01)

(52) U.S. Cl.
CPC ...................................... *G06T 1/00* (2013.01)

(58) Field of Classification Search
CPC .... G06T 1/00; G06T 2201/10016; G06T 1/10; G06K 9/0061
(Continued)

(56) References Cited

U.S. PATENT DOCUMENTS 6,115,104 A * 9/2000 Nakatsuka .............. G06T 5/001
355/18

6,130,723 A    10/2000 Medin
(Continued)

FOREIGN PATENT DOCUMENTS

| CN | 1929625 A | 3/2007 |
|---|---|---|
| CN | 101097377 A | 1/2008 |

OTHER PUBLICATIONS

Office Action issued in related Chinese Patent Application No. 201110220362.8 dated Feb. 16, 2013.

*Primary Examiner* — Kee M Tung
*Assistant Examiner* — Whitney Pointe
(74) *Attorney, Agent, or Firm* — Morgan, Lewis & Bockius LLP

(57) ABSTRACT

The present invention relates to a method for simulating image quality improvement of an image display device, in which the image display device to be tested is made to display an optimized picture quality with a simplified process by applying simplified simulation program and device; and a device therefor. The method for simulating picture quality improvement of an image display device includes the steps of selecting at least one input image data from a list of plurality of test image data by using a file input/output interface unit of a simulation tool, selecting at least one image processing algorithm from a list of a plurality of image processing algorithms by using an image control interface unit, applying the at least one image processing algorithm selected thus to the at least one input image data to convert the at least one input image data by using an algorithm application control unit, comparing and determining at least one output image data converted and forwarded thus to the input image data, and analyzing characteristics of the output image data by using a resultant image analysis and control unit.

10 Claims, 2 Drawing Sheets

(58) Field of Classification Search
USPC .......................... 345/581; 382/162, 232, 254
See application file for complete search history.

(56) References Cited

U.S. PATENT DOCUMENTS

| | | |
|---|---|---|
| 6,336,052 B1* | 1/2002 | Ouellet et al. .................. 700/83 |
| 6,816,139 B2* | 11/2004 | Park ................................ 345/87 |
| 2002/0089611 A1 | 7/2002 | Kim |
| 2002/0093518 A1* | 7/2002 | Nakano ......................... 345/643 |
| 2005/0116888 A1* | 6/2005 | Kim et al. ...................... 345/60 |
| 2008/0122813 A1 | 5/2008 | Kim et al. |
| 2009/0027732 A1* | 1/2009 | Imai ............................. 358/3.27 |

\* cited by examiner

SIMULATION METHOD FOR IMPROVING PICTURE QUALITY OF IMAGE DISPLAY DEVICE AND A SIMULATION DEVICE THEREFOR

CROSS REFERENCE TO RELATED APPLICATION

This application claims the benefit of the patent Korean Application No. 10-2010-0077537, filed on Aug. 11, 2010, which are hereby incorporated by reference as if fully set forth herein.

BACKGROUND OF THE DISCLOSURE

Field of the Disclosure

The present invention relates to improvement of simulation efficiency of an image display device, and more particularly, to a method for simulating image quality improvement of an image display device, in which the image display device to be tested is made to display an optimized picture quality with a simplified process by applying simplified simulation program and device; and a device therefor.

Discussion of the Related Art

As flat display devices on the rise currently, there are liquid crystal display devices, field emission display devices, plasma display panel devices, light emitting display devices, and so on. Owing to their excellent resolutions, color representations, and picture qualities, the flat display devices are applied to notebook computers, desktop monitors, mobile terminals, and so on, actively.

It is recent trend that a greater variety of flat display devices are developed for displaying images of higher picture qualities and higher resolutions to meet users' requirements and happiness intensity.

All of different image display devices already developed, image display devices developed newly, and image display devices having different upgraded functions are put into test processes for setting the image display devices to display optimized picture qualities before determined as a final product, respectively.

In other words, in a development step of the image display devices, simulation is made such that the image display devices under test are set to display different images by applying different image processing algorithms for making the different image display devices to display optimized picture qualities, respectively.

However, in order to perform the simulation in the related art, there have been inconveniences in that individual hardware is required for driving each of the image display devices to be tested, and a still image or a video to be used in the test is required to input to the hardware, or an image processing algorithm to be used in the test is required to apply to the hardware.

That is, in the related art simulation of the image display devices to be tested, since it is required to apply the images or the different image processing algorithms to be used in the test to the hardware which is to be applied to each of the image display devices, costs and time caused thereby is very high to impair both simulation efficiency and product development efficiency.

SUMMARY OF THE DISCLOSURE

Accordingly, the present invention is directed to a method for simulating image quality improvement of an image display device, and a device therefor.

An object of the present invention is to provide a method for simulating image quality improvement of an image display device, in which the image display device to be tested is made to display an optimized picture quality with a simplified process by applying simplified simulation program and device; and a device therefor.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for simulating picture quality improvement of an image display device includes the steps of selecting at least one input image data from a list of plurality of test image data by using a file input/output interface unit of a simulation tool, selecting at least one image processing algorithm from a list of a plurality of image processing algorithms by using an image control interface unit, applying the at least one image processing algorithm selected thus to the at least one input image data to convert the at least one input image data by using an algorithm application control unit, comparing and determining at least one output image data converted and forwarded thus to the input image data, and analyzing characteristics of the output image data by using a resultant image analysis and control unit.

The step of selecting at least one image processing algorithm from a list of a plurality of image processing algorithms by using an image control interface unit includes the steps of the user reviewing a list of a plurality of image processing algorithms displayed on an information window in the simulation tool to select image processing algorithms intended to apply in succession, making the image processing algorithms selected thus to be shown as blocks thereof together with the input image on the main window in the simulation tool, and the user changing setting of an order of application of the image processing algorithms intended to apply in advance.

The step of applying the at least one image processing algorithm selected thus to the at least one input image data to convert the at least one input image data by using an algorithm application control unit includes the steps of the user storing an algorithm application flow chart set thus, or retrieving the algorithm application flow chart stored in advance, and the user storing test result information having the image processing algorithms applied thereto, or retrieving and determining the test result information stored in advance, as necessary by controlling the image control interface unit with the image control bar in real time.

The step of applying the at least one image processing algorithm selected thus to the at least one input image data to convert the at least one input image data by using an algorithm application control unit further includes the steps of selecting each of the image processing algorithm blocks at the main window of the simulation tool for making real time change of an order of application of the image processing algorithms, and notice a result of application of the algorithm at the output image with naked eyes, by using the image control bar, retrieving and applying the algorithm application flow chart applied in advance again and selecting a pattern or a region of the test image data and applying the same as a test image, and determining the picture quality of the output image by making real time application and change of the image processing algorithms and the test application image data.

The method further includes the steps of supplying the output image data having the image processing algorithms selected thus and applied thereto to panel driving hardware for driving the image display panel, and driving the image display panel to display the output image data by using the panel driving hardware.

In another aspect of the present invention, a device for simulating picture quality improvement of an image display device includes a file input/output interface unit for selecting at least one of a plurality of test image data stored in an image data storage DB in advance as an input image, an image control interface unit for selecting at least one of image processing algorithms stored in a picture quality improvement algorithm storage DB in advance, an algorithm application control unit for applying the at least one image processing algorithm selected thus to the at least one input image data selected thus, a resultant image output control unit for comparing and determining the output image having the at least one image processing algorithm applied thereto, and a resultant image analysis and control unit for analyzing the output image data.

The image control interface unit enables the user to review a list of a plurality of image processing algorithms displayed on an information window in the simulation tool to select image processing algorithms intended to apply in succession, to make the image processing algorithms selected thus to be shown as blocks thereof together with the input image on the main window in the simulation tool, and the user to change setting of an order of application of the image processing algorithms intended to apply in advance.

The algorithm application control unit enables the user to store an algorithm application flow chart set thus, or retrieving the algorithm application flow chart stored in advance, and the user to store test result information having the image processing algorithms applied thereto, or retrieving and determining the test result information stored in advance, as necessary by controlling the image control interface unit with the image control bar in real time.

The algorithm application control unit makes real time change of an order of application of the image processing algorithms, and enables the user to notice a result of application of the algorithm at the output image with naked eyes under the control of the user, retrieves and applies the algorithm application flow chart applied in advance again and selects a pattern or a region of the test image data and applies the same as a test image, and determines the picture quality of the output image by making real time application and change of the image processing algorithms and the test application image data.

The device further includes an image display panel before determined as a final product having a plurality of pixel regions for displaying an image, and a panel driving hardware for receiving the output image data having the image processing algorithms selected thus and applied thereto and aligning the same suitable for driving the image display panel and supplying the same to the image display panel, and generating and supplying a plurality of control signals for driving the image display panel.

Thus, the method for simulating image quality improvement of an image display device and a device therefor, can make the image display device to be tested to display an optimized picture quality with a simplified process by applying simplified simulation program and device, thereby permitting to reduce cost and time required for development of a new product while improving simulation efficiency of each product.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Though an image display device applicable to the simulation in accordance with a preferred embodiment of the present invention can be a liquid crystal display device, a field emission display device, a plasma display panel, and an organic electro-luminescence display device, only a case will be described, in which the liquid crystal display device is applied to the simulation in accordance with a preferred embodiment of the present invention as an example for conveniences' sake.

Figure 1:
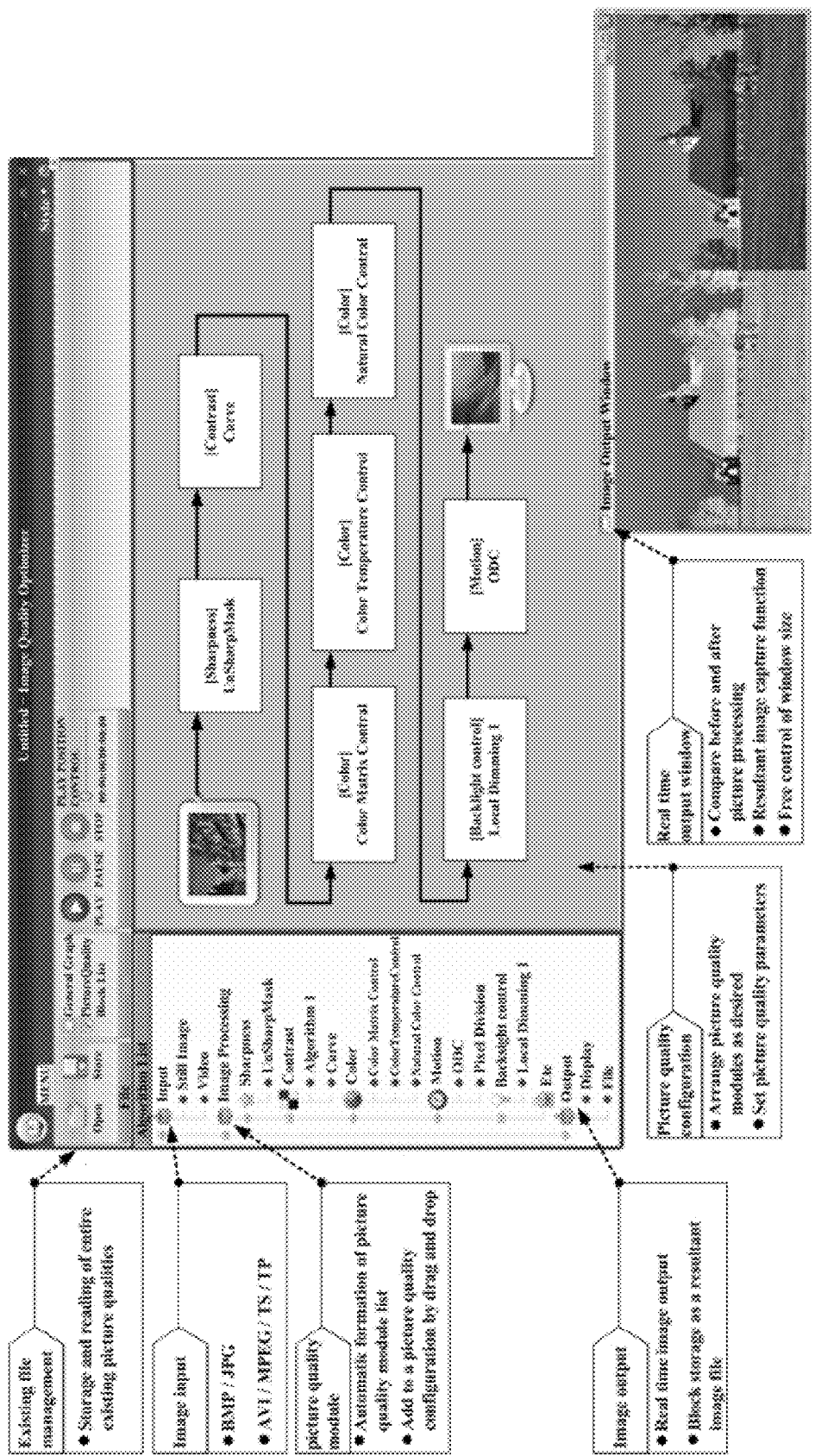
FIG. 1 illustrates a diagram for describing a method for simulating picture quality improvement of an image display device in accordance with a preferred embodiment of the present invention.
Figure 2:
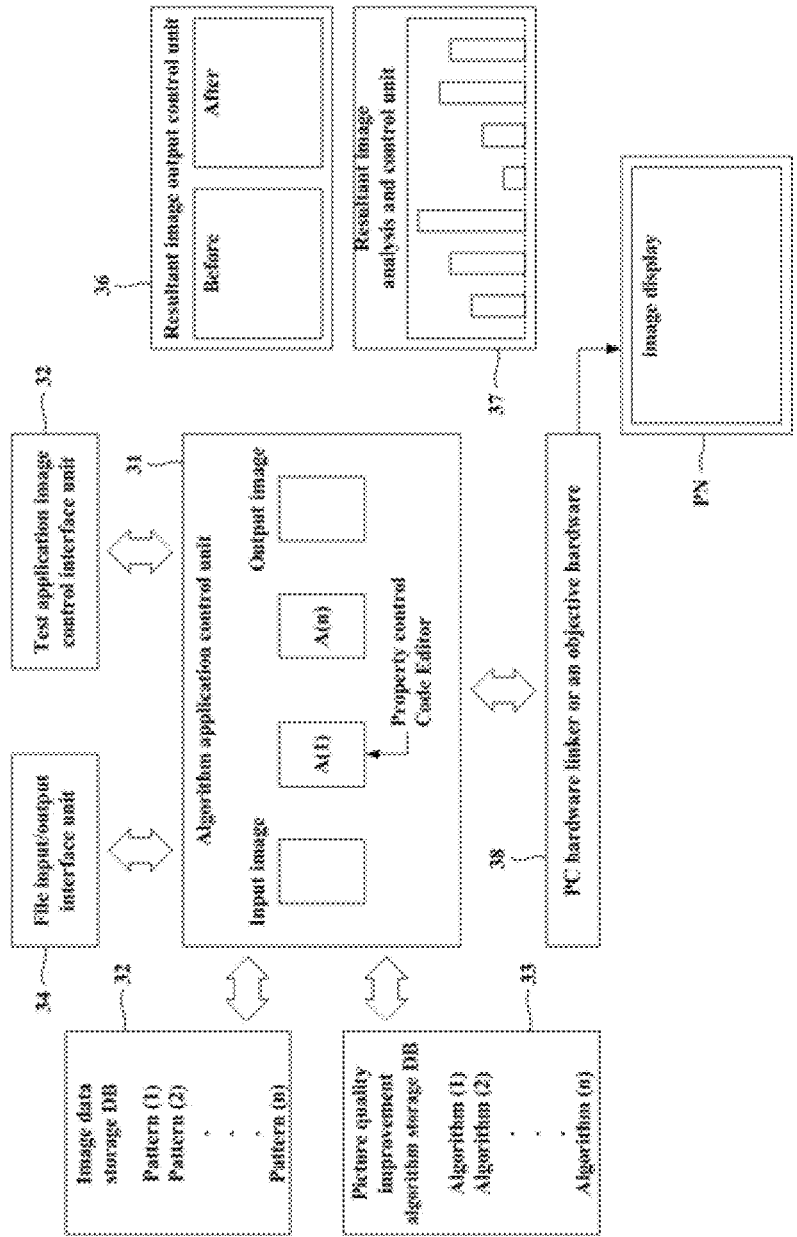
FIG. 2 is a block diagram of a device for simulating picture quality improvement of an image display device in accordance with a preferred embodiment of the present invention.

FIG. 1 illustrates a diagram for describing a method for simulating picture quality improvement of an image display device in accordance with a preferred embodiment of the present invention, and FIG. 2 illustrates a block diagram of a device for simulating picture quality improvement of an image display device in accordance with a preferred embodiment of the present invention.

Referring to a simulation tool in FIG. 1 and a simulation device in FIG. 2, the simulation method of the present invention includes the steps of selecting at least one of a plurality of test image data as an input image data with a file input/output interface unit 34 in a simulation tool, controlling an image control interface unit 35 for selecting at least one of a plurality of image processing algorithms, applying the at least one image processing algorithm selected thus to the input image data to convert the input image data by using an algorithm application control unit 31, comparing and determining at least one output image data having the at least one image processing algorithm applied thereto and converted accordingly to the input image data, and analyzing characteristics of the output image data by using a resultant image analysis and control unit 37.

In the step of selecting at least one of a plurality of test image data as an input image data, a file input/output interface unit 34 is controlled by using a file input/output interface bar in the simulation tool for selecting at least one of the plurality of test image data stored in advance as the input image.

The plurality of test image data stored in an image data storage DB 32 have a plurality of still images stored in files of BMP or JPEG, and a plurality of videos in different files of AVI, MPEG, TS, or TP. Therefore, the user controls the file input/output interface unit 34 by using file input/output interface bar, to select at least one of the plurality of test image data stored in the image data storage DB 32 in advance. In this case, as illustrated in FIG. 1, the input image selected thus is displayed on a main window of the simulation tool.

In the step of controlling an image control interface unit 35 for selecting at least one of a plurality of image processing algorithm, the user controls the image control interface unit 35 by using the file input/output interface bar for selecting at least one of the plurality of image processing algorithms stored in a picture quality improving algorithm DB 33 in advance.

The picture quality improving algorithm DB 33 has various processing algorithms, such as dark/light contrast, color difference modulation, brightness modulation, gamma level modulation, brightness setting modulation, sharpness modulation, and the like, of the displayed image stored therein. Accordingly, the user reviews a plurality of image processing algorithms displayed on an information window in the simulation tool to select image processing algorithms intended to apply in succession. As shown in FIG. 1, the image processing algorithms selected thus are shown as blocks thereof together with the input image on the main window of the simulation tool, and the user can change setting of an order of application of the image processing algorithms in advance. In this instance, the user can select an algorithm mark block for setting image processing algorithm information in detail. That is, after selecting the algorithm mark block, an extent of the dark/light contrast conversion, an extent of brightness conversion, color saturation information, accuracy information, and the like, of the image, can be set, dividing those further, on an information window displayed, additionally.

Thereafter, by controlling the image control interface unit 35 with the image control bar in real time, the user can store the order of application of the image processing algorithms set thus, i.e., an algorithm application flow chart, or retrieve and determine the algorithm application flow chart stored in advance, or store test result information, or retrieve the test result information stored in advance, as necessary.

In the step of applying the at least one image processing algorithm selected thus to the input image data to convert the input image data, the user controls an algorithm application control unit 31 by using the image control bar in the simulation tool for applying the at least one of the image processing algorithms selected thus to the input image data in succession. In this instance, the user can notice a progress state of the application of the image processing algorithms at the main window, and, if required, can change application of setting of image processing algorithm setting information as necessary. In other words, the user can select each of the image processing algorithm blocks at the main window of the simulation tool in FIG. 1 for making real time change of an order of application of the image processing algorithms, or notice a result of application of the algorithm at the output image with naked eyes. And, by using the image control bar, the user can retrieve and apply the algorithm application flow chart applied in advance or select a pattern or a region of the test image data and apply the same as a test image.

That is, the user can make real time fabrication of the test still image or video as necessary. Thus, the user can determine the picture quality of the output image by making real time application and change of the image processing algorithms and the test application image data in the step of application of the image processing algorithms.

In the step of comparing and determining at least one output image data having the at least one image processing algorithm applied thereto and changed accordingly to the input image data, the user controls a resultant image output control unit 36 by using file input/output interface bar and the image control bar, to make real time comparison and determination of the output images having the image processing algorithms applied thereto respectively at additional image output windows, respectively. In detail, the user can make real time control of the resultant image output control unit 36 to make comparative display of an original image and an image having the image processing algorithm applied thereto on the image output window to determine an extent of image change and an extent of picture quality improvement, as necessary.

And, in the step of analyzing characteristics of the output image data with a resultant image analysis and control unit 37, the user controls the resultant image analysis and control unit 37 by using the file input/output interface bar and the image control bar, to determine a result of analysis of the output image on an additional analysis result display window, selectively. In other words, the resultant image analysis and control unit 37 analyzes image information on the input image data and the output image data, for an example, image brightness histogram information, color difference contrast histogram information, color saturation information, 3D (Three Dimensional) view information, and gamma conversion histogram information, and the like. And, a result of analysis of the output image is displayed on an additional analysis result display window under the control of the user. Therefore, in the step of analyzing the output image, results before and after application of the image processing algorithm are matched to make real time review of accuracy of the algorithm applied thus and error information and so on. Eventually, information for applying the image processing algorithm, i.e., a result of analysis required for processing the image, can be derived.

The user stores the result of real time test, a resultant image, and test order information by using the file input/output interface bar and the image control bar for comparison or application to simulation of another image display device.

In the meantime, the simulation method of the present invention further includes a step of supplying the output image data having the image processing algorithms selected thus and applied thereto to a panel driving hardware 38 which drives an image display panel PN, and a step of driving the image display panel PN such that the image display panel PN displays the output image data.

In the step of supplying the output image data to the panel driving hardware 38, the output image data is supplied to the panel driving hardware 38 of a specification to be determined as a final product actually at least frame by frame to determine whether the panel driving hardware 38 is determined as a final product or not and interface information of the output image data. The panel driving hardware 38 can be a PC hardware board to be set identical to an actual product specification or a product to be determined as a final product, actually.

In the step of driving the image display panel PN for displaying the output image data on the image display panel PN, a plurality of driving control signals are generated for driving the image display panel PN with the panel driving hardware 38, and the plurality of driving control signals and the output image data are supplied to the image display panel PN such that the output image data is displayed on the image display panel PN.

As described, the method for simulating image quality improvement of an image display device can make the image display devices to display optimized picture quality with a simplified process by applying a simplified simulation program represented with one simulation tool. And, even if various products to be tested are not applied one by one, by interfacing with a PC hardware board or the like which can be set identical to an actual product specification making the PC hardware board or the like to be tested in a specification identical to the actual product, costs and time required for development of the product can be reduced while simulation efficiency of each of the products can be improved further.

A device for simulating picture quality improvement of an image display device of the present invention will be described in more detail.

Referring to FIG. 2, the simulation device of the present invention includes a file input/output interface unit 34 for selecting at least one of a plurality of test image data stored in an image data storage DB 32 in advance as an input image, an image control interface unit 35 for selecting at least one of image processing algorithms stored in a picture quality improvement algorithm storage DB 33 in advance, an algorithm application control unit 31 for applying the at least one image processing algorithm selected thus to the at least one input image data selected thus, a resultant image output control unit 36 for comparing and determining the output image having the at least one image processing algorithm applied thereto, and a resultant image analysis and control unit 37 for analyzing the output image data.

Controlled by the file input/output interface bar of the simulation tool, the file input/output interface unit 34 selects one of the plurality of test image data stored in the image data storage DB 32 in advance as the input image. As the plurality of test image data, the image data storage DB 32 has a plurality of still images stored in BMP or JPEG files, and a plurality of videos stored in various files of AVI, MPEG, TS, TP and so on. Accordingly, the user selects at least one of the plurality of test image data stored in the image data storage DB 32 as the input image data by using file input/output interface bar. In this case, as shown in FIG. 1, the input image selected thus is displayed on the main window of the simulation tool.

Controlled by the image control bar of the simulation tool, the image control interface unit 35 enables to select at least one of a plurality of image processing algorithms stored in the picture quality improvement algorithm storage DB 33 in advance. The picture quality improvement algorithm storage DB 33 has a variety of image processing algorithms, such as dark/light contrast, color difference modulation, brightness modulation, gamma level modulation, brightness setting modulation, sharpness modulation, and so on of the image to be displayed stored therein in advance. Accordingly, the user reviews a list of the plurality of image processing algorithms displayed on the information window of the simulation tool and selects the image processing algorithms intended to apply in succession.

Referring to FIG. 1, the image processing algorithms selected by the user are shown as blocks on the main window of the simulation tool together with the input image, and the user can change setting of an order of application of the image processing algorithms intended to apply in advance. In this instance, the user can select an algorithm mark block, and set image processing algorithm information in detail. Then, the user can control the image control interface unit 35 with the image control bar in real time to store an application flow chart of the image processing algorithms set thus, or retrieve the application flow chart of the image processing algorithms stored in advance, and store test result information or retrieve test result information stored in advance.

The algorithm application control unit 31 can be controlled by the image control bar in the simulation tool for application of the at least one of the image processing algorithms selected thus to the input image data in succession. In this instance, states of application of the image processing algorithms can be determined at the main window respectively, and the user can select the image processing algorithms at the main window in the simulation tool, and change an order of application of the image processing algorithms in real time, or determine a result of application of the image processing algorithms at the output image with naked eyes. And, by changing and applying the image processing algorithms and the plurality of test image data in real time by using the image control bar, the user can determine a picture quality of the output image.

Controlled by the file input/output interface bar and the image control bar, the resultant image output control unit 36 displays the output image having each of the image processing algorithms applied thereto at the image output window in real time. Accordingly, the user compare an original image to an image having the image processing algorithm applied thereto and displayed on the image output window to determine an extent of image change and an extent of picture quality improvement, as necessary.

The resultant image analysis and control unit 37 displays an analysis result of the output image on a separate analysis result display window. That is, the resultant image analysis and control unit 37 analyzes image information both on the input image data and the output image data, for an example, brightness histogram information, color difference contrast histogram information, color saturation information, 3D (Three Dimensional) view information, gamma conversion histogram information, and so on of the image data. And, under the control of the user, the resultant image analysis and control unit 37 displays the analysis result of the output image on a separate analysis result display window. Eventually, in the step of analyzing the output image, accuracy and error information and the like on the algorithm applied thus can be examined in real time by matching results before and after application of the image processing algorithm.

The user can store the test result, the resultant image, and test order information in real time by using the file input/output interface bar and the image control bar, and can compare or apply the same at the time of simulation of another image display device.

In the meantime, the simulation device of the present invention further includes an image display panel PN before determined as a final product having a plurality of pixel regions for displaying an image, and a panel driving hardware 38 for receiving the output image data having the image processing algorithms selected thus and applied thereto and aligning the same suitable for driving the image display panel PN and supplying the same to the image display panel PN, and generating and supplying a plurality of control signals for driving the image display panel PN.

The panel driving hardware 38 is any hardware of a specification to be determined as a final product actually, of which determination as a final product and interface information on the output image data is determined by receiving the output image data at least frame by frame. The panel driving hardware 38 can be a PC hardware board which can be set the same as a specification of a product determined as a final product actually, or an actual product. The panel driving hardware 38 generates a plurality of driving control signals for driving the image display panel PN, and supplies the plurality of driving control signals and the output image data to the image display panel PN for displaying the output image data on the image display panel PN.

As described in detail thus, the method for simulating image quality improvement of an image display device, and the device therefor of the present invention can make image display devices to be tested to display optimized picture qualities with a more simplified process by applying a simplified simulation program represented with one simulation tool. And, by making various products to be interfaced with PC hardware boards which can be set identical to a specification of an actual product permitting the various products to be tested in specification identical to the actual product even if the various products to be tested are not applied one by one, cost and time required for development of the product can be reduced while simulation efficiency of the product can be improved, further.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A simulation method for improving picture quality of an image display device, comprising:
    setting up input image data from each of at least one test image data selected from a plurality of test image data stored in an image data storage database;
    setting up at least one selected algorithm from at least one image processing algorithm which are selected from a plurality of image processing algorithms stored in an algorithm storage database;
    converting the input image data to output image data by applying the at least one selected algorithm to the input image data;
    displaying the input image data and the output image data on the image output window, so that a user compares and determines difference between the input image data and the output image data with naked eyes while applying the at least one selected algorithm to the input image data;
    analyzing characteristics of the input image data and characteristics of the output image data; and
    supplying the output image data to a panel driving hardware for driving the image display device,
    wherein the step of analyzing the characteristics of the input image data and the characteristics of the output image data comprises displaying a result of the analyzing the characteristics on an additional analysis result display window under an input of the user, and matching results before and after application of the at least one selected algorithm to the input image data; and
    wherein the panel driving hardware is a computer hardware board set to a same product specification as a final product.

2. The simulation method as claimed in claim 1, wherein the step of setting up the at least one selected algorithm includes:
    displaying a list of a plurality of image processing algorithms stored in an algorithm storage database on an information window so that the user reviews the list;
    setting up the at least one selected algorithm under the input of the user selecting the at least one image processing algorithm intended to apply;
    displaying the at least one selected algorithm together with the input image data as blocks thereof on the main window; and
    setting up an order of application of the at least one selected algorithm under the input of the user.

3. The simulation method as claimed in claim 2, wherein the step of converting the input image data to the output image data includes:
    successively applying the at least selected algorithm to the input image data according to the order of application which is set up under the input of the user;
    storing test result information including the output image data, the at least one selected algorithm applied thereto and the order of application of the at least one selected algorithm; and
    displaying the test result information stored in advance under the input of the user.

4. The simulation method as claimed in claim 3,
    wherein the step of converting the input image data to the output image data further includes displaying the test result information while changing the order of application of the at least one selected algorithm under the input of the user in real time, and
    wherein the input image data is a pattern or a region of the test image data which is selected from the plurality of the test image data by the user.

5. The simulation method as claimed in claim 1, wherein the characteristics of the input image data and the characteristics of the output image data include image data including at least one of image brightness histogram information, color difference contrast histogram information, color saturation information, three dimensional (3D) view information, and gamma conversion histogram information.

6. A simulation device for improving picture quality of an image display device, comprising:
    a file input/output interface unit for setting up input image data from each of at least one test image data selected from a plurality of test image data stored in an image data storage database under an input of an user;
    an image control interface unit for setting up at least one selected algorithm from at least one image processing algorithm selected from a plurality of image processing algorithms stored in an algorithm storage database under the input of the user;
    an algorithm application control unit for applying the at least selected algorithm to the input image data thereby converting the input image data to output image data;
    a resultant image output control unit for displaying the input image data and the output image data on the image output window, so that a user compares and determines a difference between the input image data and the output image data with naked eyes while applying the at least one selected algorithm to the input image data;
    a resultant image analysis and control unit for analyzing characteristics of the input image data and characteristics of the output image data;

wherein the algorithm application control unit supplies the output image data to a panel driving hardware for driving the image display device, wherein the resultant image analysis and control unit enables to display a result of the analyzing the characteristics of the input image data and the characteristics of the output image data on an additional analysis result display window under the input of the user using the file input/output interface unit and the image control unit, and matching results before and after application of the at least one selected algorithm to the input image data, wherein the panel driving hardware is a computer hardware board set to a same product specification as a final product.

7. The simulation device as claimed in claim 6, wherein the image control interface unit enables:

to display a list of a plurality of image processing algorithms stored in an algorithm storage database on an information window so that the user reviews the list, to set up the at least one selected algorithm under the input of the user selecting the at least one image processing algorithm intended to apply, to display the at least one selected algorithm together with the input image data as blocks thereof on the main window, and to set up an order of application of the at least one selected algorithm under the input of the user.

8. The simulation device as claimed in claim 7, wherein the algorithm application control unit enables:

to successively apply the at least selected algorithm to the input image data according to the order of application which is set up by the input of the user in real time, to store test result information including the output image data, the at least one selected algorithm applied thereto and the order of application of the at least one selected algorithm, and to display the test result information stored in advance under the input of the user.

9. The device as claimed in claim 8, wherein the algorithm application control unit enables to display the test result information while changing the order of application of the at least one selected algorithm under the input of the user in real time, wherein the algorithm application control unit sets up the input image data from a pattern or a region of the test image data which is selected from the plurality of the test image data by the user.

10. The simulation device as claimed in claim 6, wherein the characteristics of the input image data and the characteristics of the output image data include image data including at least one of image brightness histogram information, color difference contrast histogram information, color saturation information, three dimensional (3D) view information, and gamma conversion histogram information.

* * * * *